Patented Nov. 22, 1938

2,137,957

UNITED STATES PATENT OFFICE 2,137,957

ALKALINE EARTH METAL DOUBLE SALTS OF ORGANIC ACIDS AND METHOD OF PRODUCING SAME

Herman Seydel, Jersey City, and Albert H. Reiners, Cranford, N. J., assignors to Seydel Chemical Company, Jersey City, N. J., a corporation No Drawing. Application October 11, 1934, Serial No. 747,984

27 Claims. (Cl. 260—471)

This invention relates to improvements in medicinal compounds as made from an alkaline earth metal, combined with an aralyl or alkyl ester possessing anti-spasmodic property, and an organic acid or its derivative having desirable therapeutic qualities, antipyretic, analgesic, alterative, and/or antiseptic.

A further object of the invention is the provision of an improved medicinal compound.wherein non-toxic alkaline earth metals are combined into compounds possessing the antispasmodic action of certain acidic esters accompanied by antipyretic, analgesic, alterative, and/or antiseptic properties of third components.

A further object of the invention is to provide a new medicinal compound or composition of matter having a suitable non-toxic alkaline earth metal (calcium, magnesium, or strontium), the mono ester of a di-basic organic acid of the general nature of succinic acid for one valence, the other valence being satisfied by an organic group possessing a synergistic effect to the alkaline earth metal and/or the aforesaid ester.

These compounds are represented by general type formula:

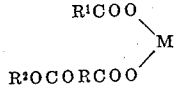

In this formula M represents a divalent metal such as calcium, magnesium or strontium. $R^1$ represents a phenyl group or a substituted phenyl group such as hydroxy phenyl, ethoxy phenyl, acetyl hydroxy phenyl, or amino phenyl. $R^2$ represents an alkyl radical such as ethyl, or a substituted alkyl-radical such as benzyl, hydroxy benzyl, ethoxy benzyl, acetyl hydroxy benzyl, or amino benzyl. R represents the nucleus of a di-basic aliphatic acid. In succinic acid the nucleus R is $(CH_2)_2$. These compounds may be prepared in either aqueous or anhydrous media. The following example will illustrate the preferred method of procedure when using an aqueous medium. The general process as it applies specifically to the manufacture of the calcium double salt of benzoic acid and mono-benzyl succinic acid may be illustrated as follows:—

One mol. of lime is slaked by warming it with an excess of water. To the hydrated lime suspension is then added one mol. of benzoic acid, and the mixture heated and stirred until the combination of the lime and the benzoic acid is complete. The temperature is then allowed to drop to about 80° C. at which point 1 mol. of monobenzyl succinic acid is added. A fusion takes place. As the temperature is lowered further with constant stirring the pure double salt crystallizes out as a cheesy white mass retaining considerable water. Drying under atmospheric conditions gives a double salt containing one mol. of water of crystallization.

For purposes of defining its physical properties, the above can be purified, and the pure product shows the following characteristics:

It crystallizes from water in the form of small white needles which retain one molecule of water of crystallization. Analysis for calcium has shown it to contain very close to the theoretical of 10.38% calcium for the hydrated salt. It is soluble to the extent of about 5% in water, slightly soluble in alcohol, and insoluble in ether. When fractionally crystallized from water its composition does not change, indicating that it is a true double salt and not a mixture of salts. The double salt has a faint fruity odor and a mild sweet taste, making it particularly suitable for oral administration. When heated in a sealed capillary tube it melts completely to a clear liquid at about 130° C.

For purposes of tabletting or for incorporation in elixir, it is not required that the product be absolutely free of excess of one of its three components, for they having synergistic effects, a little excess of one component will not materially affect the therapeutic value of the whole. It is, therefore, permissible to so compound the material as to have either an alkaline or acidic reaction.

Similar compounds can be produced in the same manner by the substitution of the benzyl or aromatic alcohol by an alkyl group; the end product would then be the alkyl succinic-benzoic compound of calcium.

Another group can be made by the substitution of the succinic acid by similar di-basic acids, such as fumaric, maleic, etc.

In the specific example given above benzoic acid was chosen as the $R^1$ component. It is understood that similar compounds may be made by the substitution of benzoic acid by one of its analogs, such as hydroxy benzoic acid, ethoxy benzoic acid, acetyl hydroxy benzoic acid, amino benzoic acid, or other aromatic acids having therapeutic value synergistic to that of the ester of the di-basic acid and/or that of the alkaline earth metal.

Likewise, similar compounds may be made by substituting for hydroxy benzoic acids, their alkyl or aralkyl esters, where the alkyl or aralkyl group is attached to their carboxyl group and the acidic part is represented by the OH of its phenolic character, the metal forming, in effect, a phenolate instead of a carboxylic salt.

Substitution of the aromatic acid by an acyl derivative as in the case of acetyl hydroxy benzoic acid, calls for a somewhat different method of manufacture, so as to prevent the hydrolysis of the derivative by either the water or the basic alkaline earth metal.

The calcium double salt of acetyl salicylic acid benzoic acid and monobenzyl succinic acid may, for example, be made by mixing molecular proportions of calcium hydroxide, acetyl salicylic acid, and monobenzyl succinic acid in anhydrous alcohol. The product prepared in this way is a stable, white or pinkish white, microcrystalline powder. Its solubilities are much the same as those of the corresponding benzyl succinic-benzoic acid double salt mentioned above. Analysis has shown it to contain very close to the theoretical calcium content (9.41%). Heated in a sealed capillary tube it fuses at a higher temperature (about 190° C.) than the corresponding benzoic acid double salt.

The calcium double salt of ethoxy benzoic acid and monobenzyl succinic acid may be made by either of the above described methods. It is a white crystalline powder with an aromatic odor resembling wintergreen. Like the previously described salts it has a mild sweet taste. A calcium analysis has shown it to contain very nearly the theoretical calcium content (9.72%). Its solubilities are very nearly the same as the corresponding benzoic acid double salt and it melts at a little higher temperature (about 140° C.).

The foregoing types were purposely made of the more commonly known ingredients. Clinical evidence may reveal that one or more modifications would be desirable in order to exert maximum action on one or more parts of the body; departures, therefore, may be made from the examples cited.

Thus in the above composition of matter, so far as alkaline earth metals are concerned, it is preferred to use a non-toxic alkaline earth metal such as calcium, magnesium or strontium. All of these have distinctive therapeutic properties and it is to be distinctly understood so far as this invention is concerned, that the generic term "non-toxic alkaline earth metal" includes all alkaline earth metals which have distinctive therapeutic properties valuable in the improved composition of matter. The only alkaline earth which we have found to be distinctly poisonous is barium. We consider calcium to be the best alkaline earth metal for the improved medical compound, because of its sedative action, although magnesium has a stimulative action and may in some cases be preferred.

It will be understood that the examples of ingredients and medicaments above given are illustrative in character, and may be widely modified without departing from the spirit of our invention, not only insofar as their respective equivalents are concerned, but also with respect to the nature of preparing the same and the proportions in which the same are used.

We claim:

1. The process of producing therapeutic mixtures which consists in mixing a member of the group consisting of the oxide and hydroxide of an alkaline earth metal selected from a group consisting of calcium, magnesium, and strontium, with a monoester selected from a group consisting of the short chain alkyl and aralkyl esters of a dibasic aliphatic acid, and a mononuclear monobasic aromatic acid.

2. The process of producing therapeutic mixtures which consists in mixing a member of the group consisting of the oxide and hydroxide of an alkaline earth metal selected from a group consisting of calcium, magnesium, and strontium, with a monoester selected from a group consisting of the short chain alkyl and aralkyl esters of a dibasic aliphatic acid, and a derivative selected from a group consisting of the alkyl and aralkyl esters of hydroxy mononuclear monobasic aromatic acids.

3. The process of producing therapeutic mixtures which consists in mixing a member of the group consisting of the oxide and hydroxide of calcium with a monoester selected from a group consisting of the short chain alkyl and aralkyl esters of a dibasic aliphatic acid, and a mononuclear monobasic aromatic acid.

4. The process of producing therapeutic salts which consists in reacting the oxide of a metal selected from a group consisting of calcium, magnesium, and strontium, with the monoester selected from a group consisting of the short chain alkyl and aralkyl esters of a dibasic aliphatic acid, and a derivative selected from a group consisting of the alkyl and aralkyl esters of hydroxy mononuclear monobasic aromatic acids.

5. The process of producing therapeutic salts which consists in reacting the hydroxide of a metal selected from a group consisting of calcium, magnesium, and strontium, with the monoester selected from a group consisting of the short chain alkyl and aralkyl esters of a dibasic aliphatic acid and a mononuclear monobasic aromatic acid.

6. The process of producing a medicinal composition of matter which consists in mixing an aqueous suspension of a hydroxide of the metal selected from a group consisting of calcium, magnesium, and strontium, with a mononuclear monobasic aromatic acid and the monoester selected from a group consisting of the short chain alkyl and aralkyl esters of a di-basic aliphatic acid.

7. A therapeutic product, the calcium double salts of a monoester selected from a group consisting of the short chain alkyl and aralkyl esters of dibasic aliphatic acids, and a mononuclear monobasic aromatic acid.

8. A therapeutic product consisting of the calcium double salt of the monobenzyl ester of succinic acid, and benzoic acid.

9. A therapeutic product consisting of the calcium double salts of the mono benzyl ester of succinic acid, and amino benzoic acid.

10. A mixture of reagents consisting of the hydroxide of a metal selected from a group consisting of calcium, magnesium and strontium, a monoester selected from a group consisting of the short chain alkyl and aralkyl esters of dibasic aliphatic acids, and a mononuclear monobasic aromatic cid.

11. A compound produced by combining a metal selected from a group consisting of calcium, magnesium, and strontium, with a monoester selected from a group consisting of the short chain alkyl and aralkyl esters of a dibasic aliphatic acid, and a mononuclear monobasic aromatic acid, to form the double salt of that metal.

12. A chemical compound having the following structural formula

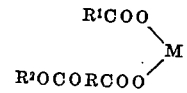

in which M represents a metal selected from a group consisting of calcium, magnesium and strontium.

R represents the nucleus of a dibasic aliphatic acid.

$R^1$ represents the nucleus of an aromatic acid.

$R^2$ represents a univalent alcohol group.

13. A chemical compound produced by combining the monoester selected from a group consisting of the short chain alkyl and aralkyl esters of a dibasic aliphatic acid, and a derivative selected from a group consisting of the alkyl and aralkyl esters of hydroxy, mononuclear monobasic aromatic acids, with a metal selected from a group consisting of calcium, magnesium, and strontium.

14. A chemical compound having the following structural formula

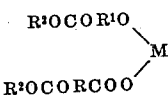

in which M represents a metal selected from a group consisting of calcium, magnesium, and strontium.

R represents the nucleus of a dibasic aliphatic acid.

R¹ represents the nucleus of an aromatic acid.

R² represents a univalent alcohol group in which a monoester selected from a group consisting of the short chain alkyl and aralkyl esters of a dibasic aliphatic acid is combined with one valence of a metal selected from a group consisting of calcium, magnesium, and strontium, the other valence being combined through a phenolic linkage with an ester selected from a group consisting of the alkyl and aralkyl esters of mononuclear monobasic hydroxy aromatic acids.

15. A compound consisting of calcium combined with a monoester selected from a group consisting of the short chain alkyl and aralkyl esters of a dibasic aliphatic acid, and through a phenolic linkage, also combined with an ester of hydroxy benzoic acid, selected from a group consisting of the alkyl and aralkyl esters of hydroxy benzoic acids.

16. A compound consisting of a monoester selected from a group consisting of the short chain alkyl and aralkyl esters of a dibasic aliphatic acid, and benzoic acid, combined with a metal selected from a group consisting of calcium, magnesium, and strontium.

17. A compound consisting of a monoester selected from a group consisting of the short chain alkyl and aralkyl esters of succinic acid, and benzoic acid, combined with a metal selected from a group consisting of calcium, magnesium, and strontium.

18. A compound consisting of the mono benzyl ester of succinic acid and benzoic acid combined with a metal selected from a group consisting of calcium, magnesium, and strontium.

19. A compound consisting of the monoester selected from a group consisting of the short chain alkyl and aralkyl esters of a dibasic aliphatic acid, and a nuclear substituted benzoic acid, combined with a metal selected from a group consisting of calcium, magnesium, and strontium.

20. A compound consisting of the monoester selected from a group consisting of the short chain alkyl and aralkyl esters of a dibasic aliphatic acid, and amino benzoic acid, combined with a metal selected from a group consisting of calcium, magnesium, and strontium.

21. A compound consisting of a monoester selected from a group consisting of the short chain alkyl and aralkyl esters of succinic acid, and amino benzoic acid, combined with a metal selected from a group consisting of calcium, magnesium and strontium.

22. A compound consisting of the monobenzyl ester of succinic acid, and amino benzoic acid, combined with a metal selected from a group consisting of calcium, magnesium, and strontium.

23. A compound consisting of a monoester selected from a group consisting of the short chain alkyl and aralkyl esters of a dibasic aliphatic acid, and an ester selected from a group consisting of the alkyl and aralkyl esters of a hydroxy benzoic acid, combined with a metal selected from a group consisting of calcium, magnesium, and strontium.

24. A compound consisting of a monoester selected from a group consisting of the short chain alkyl and aralkyl esters of succinic acid and an ester selected from a group consisting of the alkyl and aralkyl esters of hydroxy benzoic acid, combined with a metal selected from a group consisting of calcium, magnesium, and strontium.

25. A compound consisting of the monobenzyl ester of succinic acid, and an ester selected from a group consisting of the alkyl and aralkyl esters of hydroxy benzoic acid, combined with a metal selected from a group consisting of calcium, magnesium, and strontium.

26. A compound consisting of the monobenzyl ester of succinic acid and the methyl ester of hydroxy benzoic acid, combined with a metal selected from a group consisting of calcium, magnesium, and strontium.

27. A therapeutic product consisting of the double salt of a metal selected from a group consisting of calcium, magnesium, and strontium, combined with a monoester selected from a group consisting of the short chain alkyl and aralkyl esters of dibasic aliphatic acids, and an acidic radical derived and selected from a group consisting of the mononuclear monobasic aromatic acids and the alkyl and aralkyl esters of mononuclear monobasic hydroxy aromatic acids.

HERMAN SEYDEL.
ALBERT H. REINERS.